US006281158B1

(12) United States Patent
Gabrielov et al.

(10) Patent No.: US 6,281,158 B1
(45) Date of Patent: Aug. 28, 2001

(54) PREPARATION OF A CO-CONTAINING HYDROTREATING CATALYST PRECURSOR AND CATALYST

(75) Inventors: Alexei Grigorievich Gabrielov; Patrick Minter Killough, both of Houston, TX (US)

(73) Assignee: Shell Oil Company, Houston, TX (US)

(*) Notice: Subject to any disclaimer, the term of this patent is extended or adjusted under 35 U.S.C. 154(b) by 0 days.

(21) Appl. No.: 09/692,688

(22) Filed: Oct. 19, 2000

Related U.S. Application Data

(63) Continuation-in-part of application No. 09/250,208, filed on Feb. 15, 1999, now Pat. No. 6,218,333.

(51) Int. Cl.[7] .......................... B01J 27/02; B01J 27/047; B01J 27/051; B01J 27/049; B01J 27/043
(52) U.S. Cl. .......................... 502/216; 502/219; 502/220; 502/221; 502/222; 502/313; 502/314; 502/315
(58) Field of Search .................................. 502/313, 321, 502/325, 216, 220, 221

(56) References Cited

U.S. PATENT DOCUMENTS

| 2,744,052 | * | 5/1956 | Nozaki et al. ............... 196/24 |
|---|---|---|---|
| 3,509,044 | | 4/1970 | Adams et al. ............... 208/216 |
| 3,686,137 | | 8/1972 | Gatti ............... 252/437 |
| 3,761,397 | | 9/1973 | Gatti ............... 208/143 |
| 3,770,617 | | 11/1973 | Riley et al. ............... 208/216 |
| 4,530,917 | | 7/1985 | Berrebi ............... 502/220 |
| 4,548,920 | | 10/1985 | Thompson et al. ............... 502/219 |
| 4,574,120 | | 3/1986 | Thompson ............... 502/220 |
| 4,636,487 | | 1/1987 | Parrott et al. ............... 502/168 |
| 4,960,506 | | 10/1990 | Halbert et al. ............... 208/215 |
| 4,981,828 | | 1/1991 | Takahashi et al. ............... 502/168 |
| 4,992,403 | | 2/1991 | Takahashi et al. ............... 502/164 |
| 5,045,518 | | 9/1991 | Heineman et al. ............... 502/216 |
| 5,107,051 | * | 4/1992 | Pannell ............... 585/733 |
| 5,139,990 | | 8/1992 | de Jong et al. ............... 502/216 |
| 5,164,354 | | 11/1992 | Aldridge et al. ............... 502/220 |
| 5,198,100 | | 3/1993 | Aldridge et al. ............... 208/89 |
| 5,334,307 | | 8/1994 | Simpson et al. ............... 208/254 H |
| 5,336,654 | | 8/1994 | Aldridge et al. ............... 502/170 |
| 5,338,717 | | 8/1994 | Aldridge et al. ............... 502/211 |
| 5,468,372 | | 11/1995 | Seamans et al. ............... 208/216 |
| 5,525,211 | | 6/1996 | Sudhakar et al. ............... 208/217 |
| 5,674,801 | * | 10/1997 | George ............... 502/327 |
| 5,688,736 | | 11/1997 | Seamans et al. ............... 502/219 |
| 5,703,034 | * | 12/1997 | Offshack et al. ............... 510/376 |
| 5,770,046 | | 6/1998 | Sudhakar ............... 208/216 R |
| 5,851,382 | | 12/1998 | Sudhakar ............... 208/216 R |
| 5,922,638 | | 7/1999 | Dufresne et al. ............... 502/216 |
| 5,942,331 | * | 8/1999 | Miyauchi et al. ............... 428/428 |
| 6,090,745 | * | 7/2000 | DuBois et al. ............... 502/313 |
| 6,162,350 | * | 12/2000 | Soled et al. ............... 208/113 |

FOREIGN PATENT DOCUMENTS

| 181035 | 5/1986 | (EP) . |
|---|---|---|
| 9641848 | 12/1996 | (WO) . |

OTHER PUBLICATIONS

Labruyere, et al., "Ex Situ Sulfidation by Alkylpolysulfide", Catalysis Today 43 (1998), pp. 111–116, no copies provided; copies found in co–pending 09/713,971, month N/A.

Maitra, et al., "Novel Hydrotreating Catalysts Prepared from Heteropolyanion Complexes Impregnated on Alumina", Applied Catalyst, 48 (1989), pp. 187–197, no copies provided; copies found in co–pending 09/713,971, Sep. 1988.

* cited by examiner

Primary Examiner—Mark L. Bell
Assistant Examiner—Patricia L. Hailey

(57) ABSTRACT

This invention provides a cobalt-containing catalyst precursor for the preparation of a catalyst for catalytic hydrotreatment of hydrocarbonaceous feedstocks, and for a method of making same.

10 Claims, 4 Drawing Sheets

RAW DATA
DIFFUSE REFLECTANCE ULTRAVIOLET-VISIBLE (UV-Vis) ELECTROMAGNETIC RADIATION SPECTRA

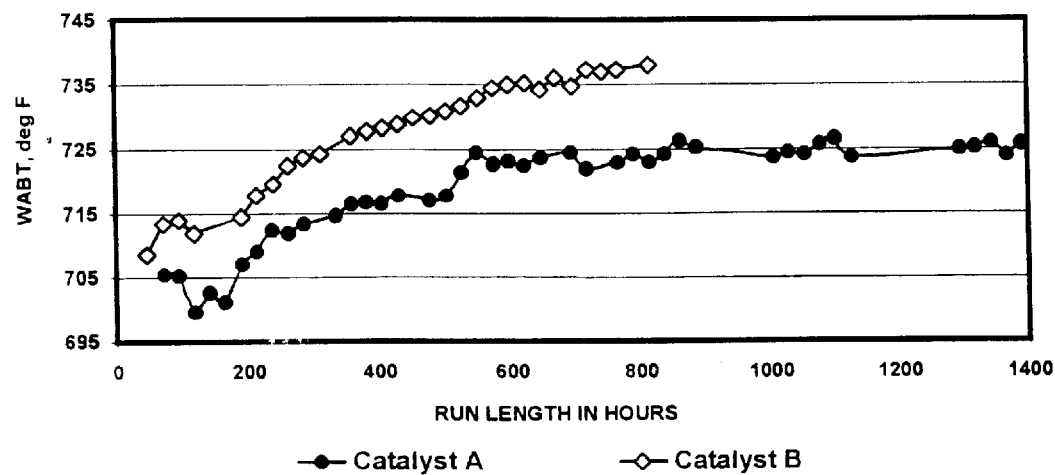
FIGURE 1. WABT REQUIRED FOR 88% SULFUR REMOVAL
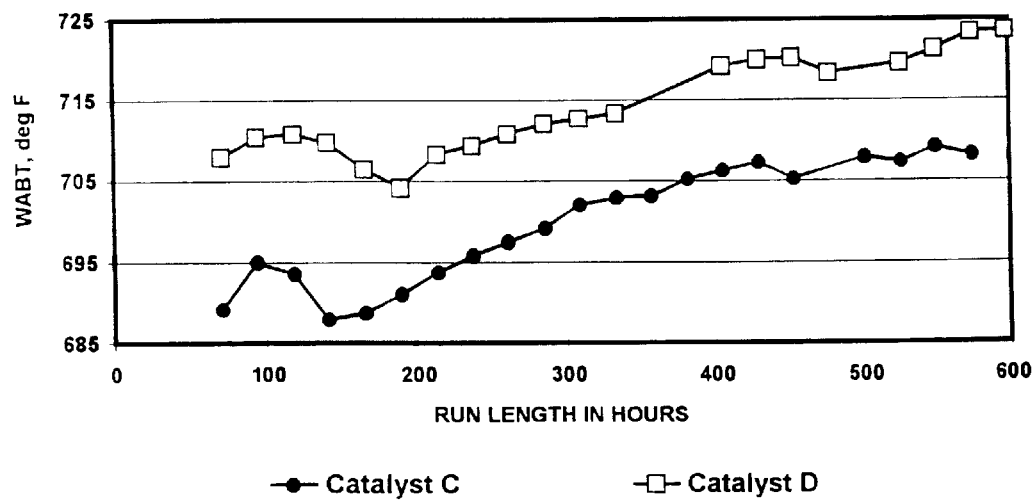
FIGURE 2. WABT REQUIRED FOR 88% SULFUR REMOVAL

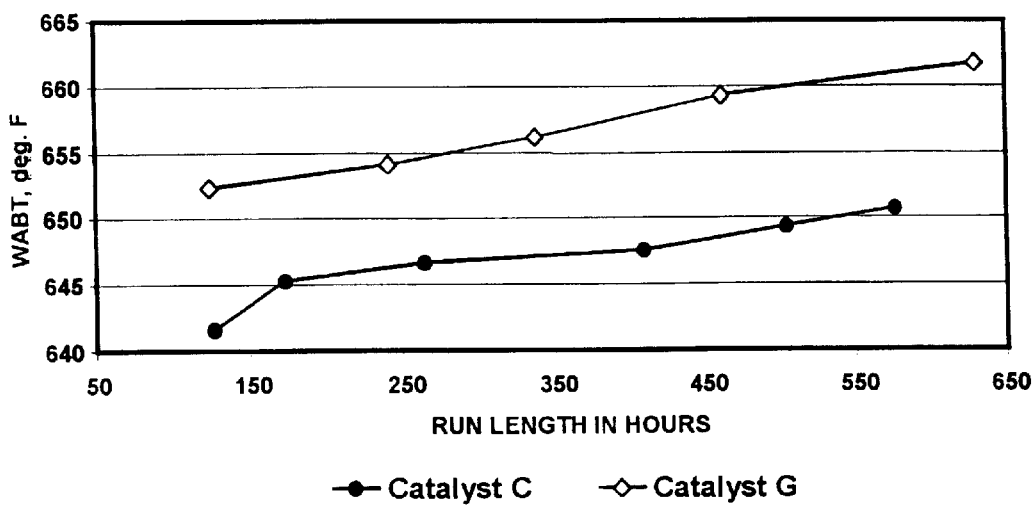
FIGURE 3. WABT REQUIRED FOR 30% TOTAL NITROGEN REMOVAL
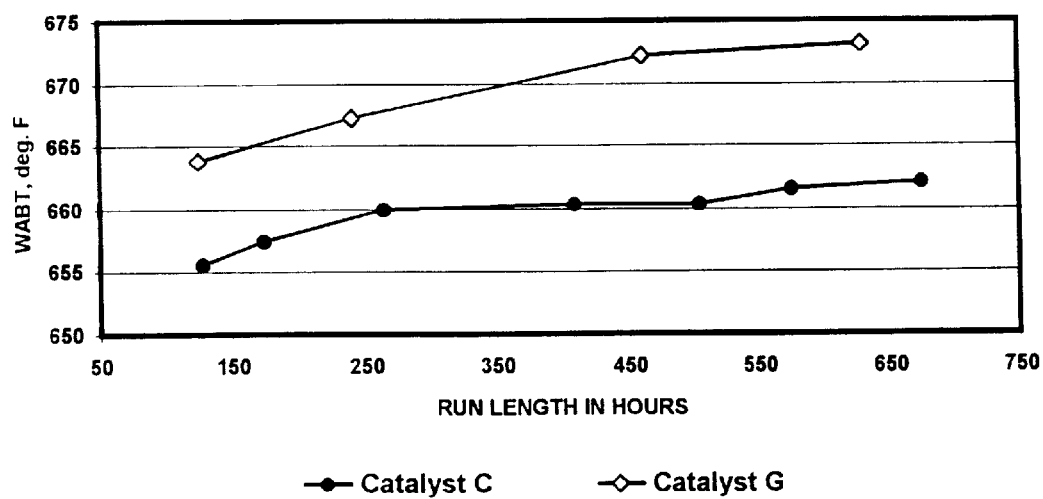
FIGURE 4. WABT REQUIRED FOR 30% BASIC NITROGEN REMOVAL

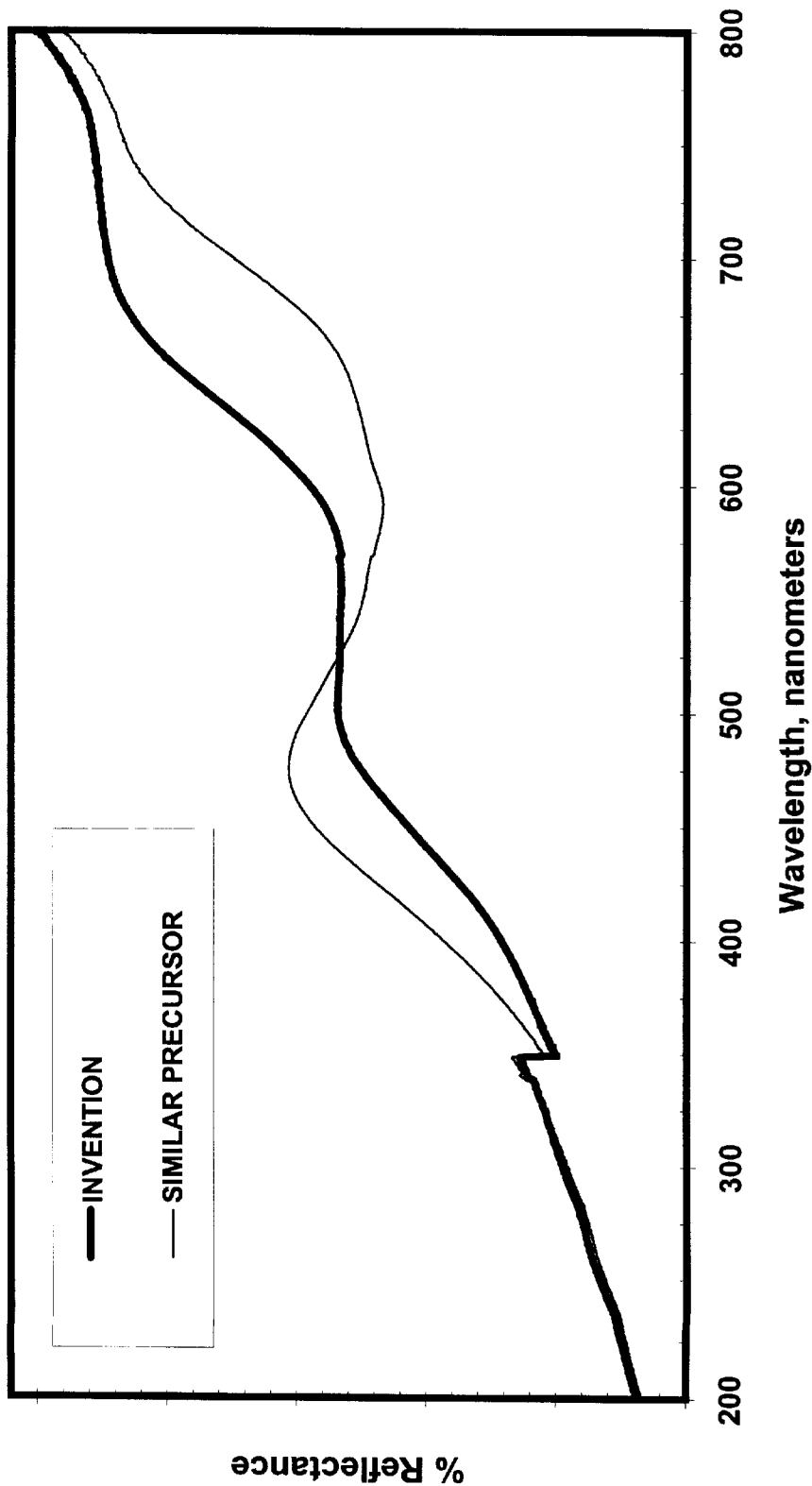

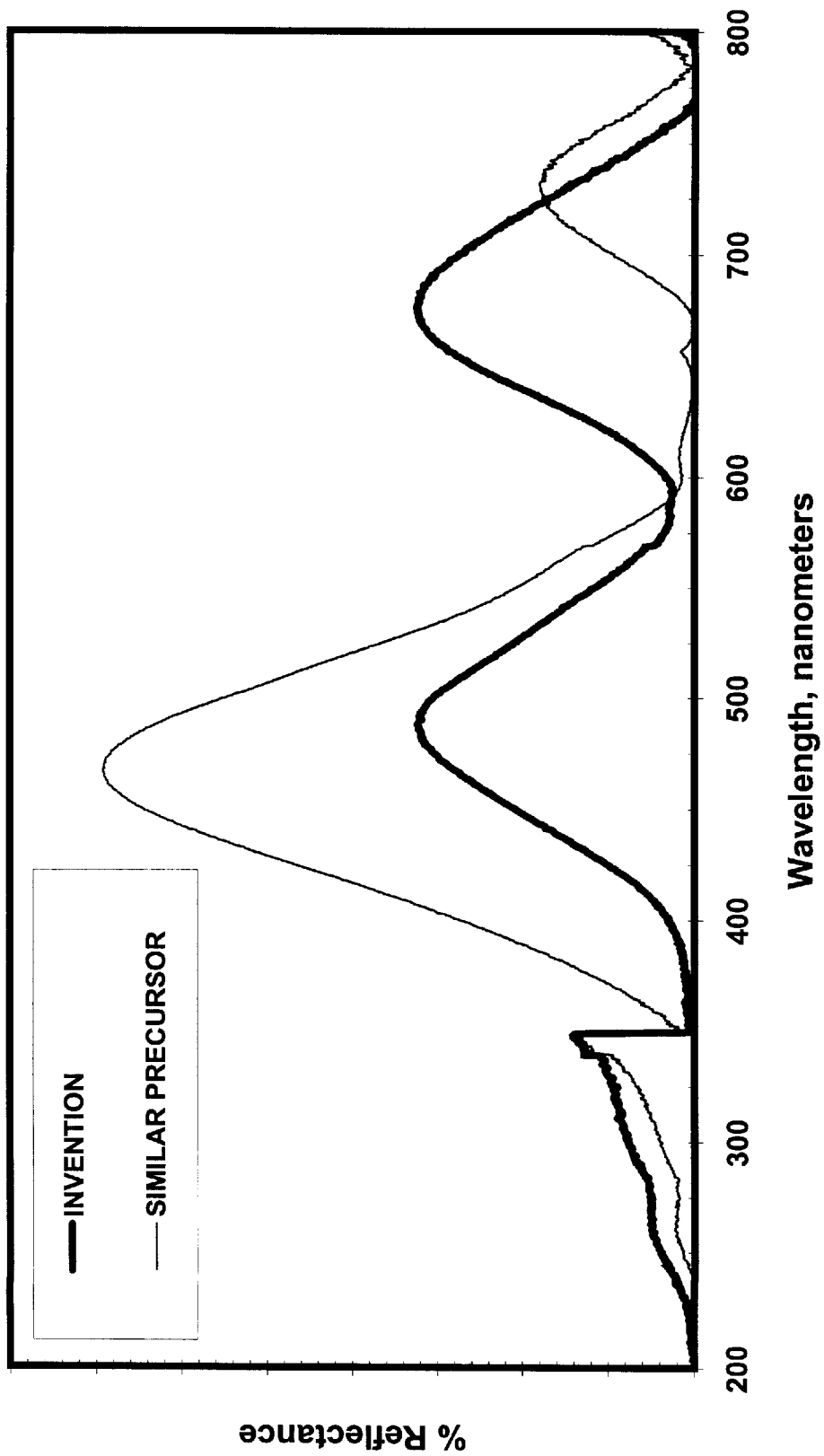

PREPARATION OF A CO-CONTAINING HYDROTREATING CATALYST PRECURSOR AND CATALYST

This application is a continuation-in-part application of application Ser. No. 09/250,208, filed Feb. 15, 1999, now U.S. Pat. No. 6,218,333.

FIELD OF THE INVENTION

This invention relates to a cobalt-containing catalyst precursor for the preparation of a catalyst for catalytic hydrotreatment of hydrocarbonaceous feedstocks.

BACKGROUND OF THE INVENTION

Petroleum feedstocks are characterized by relatively high levels of contaminants, including sulfur, nitrogen, Conradson carbon residue, aromatic compounds and metals such as nickel, vanadium and iron. During catalytic hydroprocessing heterogeneous catalysts are contacted with a feedstock in the presence of hydrogen under conditions of elevated temperature and pressure to reduce the concentration of the contaminants in feedstocks. The hydrotreating process promotes reactions such as hydrodesulfurization (HDS), hydrodenitrogenation (HDN), Conradson carbon removal, hydrodemetallation (HDM) and aromatics saturation, accompanied by a boiling shift to lower boiling products. As the sulfur and nitrogen components are converted into hydrogen sulfide and ammonia, metals are deposited onto the catalyst. The results include producing ecologically clean hydrocarbon products such as fuels and protecting other downstream refining catalysts from deactivation.

Processes for removing heteroatoms from feedstocks are known in the art as are catalysts for such removal. Typically, hydroprocessing catalysts contain Group VI and/or Group VIII active metal components supported on a porous refractory oxide such as alumina, alumina-silica, silica, zeolites, titania, zirconia, boria, magnesia and their combinations. Such catalysts are often prepared by combining the active metals with the support. The supports, containing metal components, are typically dried and calcined at the temperatures ranging from about 370° C. to 600° C. to eliminate any solvent and to convert metals to the oxide form. The calcined metal oxide catalysts are then typically activated by contacting with a sulfur containing compound such as hydrogen sulfide, organic sulfur compounds or elemental sulfur to convert metal oxides into catalytically active metal sulfides.

An important and continuing aim in the refining catalyst art is to develop new high performance hydroprocessing catalysts in order to obtain high quality oil products and improve refinery economics. Variations in compositional characteristics or methods of preparation of hydroprocessing catalysts have been attempted to reach these objectives.

It is known in the art that uncalcined catalysts usually provide higher dispersion of active components thereby improving hydrotreating activities. It is essential for the uncalcined catalysts that the active components, such as Group VI and/or Group VIII metal compounds, and promoters such as phosphorous, are not converted into oxide form during a high temperature step. That is, the active compounds are maintained without chemical decomposition until sulfurizing. For example, U.S. Pat. Nos. 5,198,100, 5,336,654 and 5,338,717 disclose a method for preparing a hydrotreating catalyst by impregnating a refractory support with a salt of Group VI metals and with the Group VIII metal heteropolyacids. The catalyst is not calcined or subjected to high temperatures, thereby retaining the heteropolyacids in the original form on the support; however, complete moisture removal from the catalyst during a high vacuum drying step is required before the catalyst is sulfurized.

In general, as the activity of an uncalcined catalyst is increased, the hydrotreating conditions required to produce a given oil product become more mild. Milder conditions require less capital investment to achieve the desired product specifications, such as allowed levels of sulfur, nitrogen, Conradson carbon residue, metals and aromatics, and the catalyst's life is extended due to lower coke formation and other factors.

It has surprisingly been found that preparation of an uncalcined catalyst using a combined volatile content reduction-sulfurizing step allows for the catalyst to be prepared at lower temperatures, in less steps and without calcination, resulting in a catalyst with excellent hydrotreating activity and stability.

SUMMARY OF THE INVENTION

This invention provides a cobalt-containing catalyst precursor that allows one to prepare a catalyst while using a combined volatile content reduction-sulfurizing step. The cobalt-containing catalyst precursor of this invention is characterized by its color which is defined by having reflectance maxima between 460 nm and 500 nm and between 660 nm and 690 nm when subjected to Ultraviolet-visible (UV-vis) Electromagnetic Radiation. The use of a catalyst precursor exhibiting this characteristic has been found to produce superior catalyst when employed in the process of this invention.

The process of this invention comprises:

providing a porous support;

combining said support with one or more catalytically active metals, thereby forming a catalyst precursor having a volatile content; and reducing the volatile content of the catalyst precursor in one or more steps, wherein at least one volatile content reduction step is performed in the presence of at least one sulfur containing compound;

wherein the catalyst precursor does not reach calcining temperatures prior to said at least one combined volatile content reduction-sulfurizing step.

There is also provided a process for preparing a catalyst suitable for hydrotreatment of a hydrocarbonaceous feedstock, said process comprising:

combining a porous support with one or more catalytically reactive metals selected from Group VI and Group VIII of the Periodic Table, thereby forming a catalyst precursor having a volatile content; and reducing the volatile content of the catalyst precursor in one or more steps, wherein at least one volatile content reduction step is performed in the presence of at least one sulfur containing compound;

wherein the catalyst precursor does not reach calcining temperatures prior to said at least one combined volatile content reduction-sulfurizing step.

Further, there is provided a process for hydrotreating a hydrocarbonaceous feedstock, said process comprising contacting said feedstock at elevated temperature and elevated pressure in the presence of hydrogen with one or more catalyst beds; wherein at least one catalyst bed contains a catalyst prepared by the process comprising combining a porous support with one or more catalytically reactive metals selected from Group VI and Group VIII of the Periodic Table, thereby forming a catalyst precursor having a volatile content and reducing the volatile content of the catalyst precursor in one or more steps, wherein at least one volatile content reduction step is performed in the presence of one or more sulfur containing compounds; and wherein the catalyst precursor does not reach calcining temperatures prior to said at least one combined volatile content reduction-sulfurizing step.

There is further provided a catalyst made by the process comprising combining a porous support with one or more catalytically active metals, thereby forming a catalyst precursor having a volatile content; and reducing the volatile content of the catalyst precursor in one or more steps, wherein at least one volatile content reduction step is performed in the presence of at least one sulfur containing compounds; wherein said catalyst precursor does not reach calcining temperatures prior to said at least one combined volatile content reduction-sulfurizing step.

BRIEF DESCRIPTION OF THE DRAWINGS

FIG. 1. shows the weighted average bed temperature (WABT) required for 88% HDS activity of a catalyst made by the process of the invention versus a catalyst made by a conventional process.

FIG. 2. shows the WABT required for 88% HDS activity of a catalyst made by the process of the invention versus a commercial catalyst.

FIG. 3. shows the temperature required for 30% total nitrogen removal by a catalyst made by the process of the invention versus a commercial catalyst.

FIG. 4. shows the temperature required for 30% basic nitrogen removal by a catalyst made by the process of the invention versus a commercial catalyst.

FIG. 5. shows the raw data for percent reflectance versus wavelength for the Co-containing catalyst precursor of the present invention when it is subjected to Diffuse Reflectance Ultraviolet-visible (UV-vis) Electromagnetic Radiation and detection of the light is done using a diffuse reflectance apparatus compared to that of a chemically similar precursor that is not an effective catalyst precursor for use in the process of the present invention.

FIG. 6. shows the baseline-corrected data for percent reflectance versus wavelength for the Co-containing catalyst precursor of the present invention when it is subjected to Diffuse Reflectance Ultraviolet-visible (UV-vis) Electromagnetic Radiation and detected with a diffuse reflectance apparatus compared to that of a chemically similar precursor that is not an effective catalyst precursor for use in the process of the present invention.

DETAILED DESCRIPTION

In conventional preparation of sulfurized catalysts, an inorganic support is dried, calcined and combined with one or more catalytically active metals to form a catalyst precursor. The precursor is then optionally aged and moisture is driven from the pores of the precursor by drying. The catalyst precursor is then calcined at high temperature in direct contact with hot gas to remove residual moisture and to convert metal precursor into oxide form. "Calcination temperatures" as used herein shall mean the calcination temperatures of 400° C. to 600° C., which are typically used in the art. When calcination is completed, the precursor is sulfurized to form a catalyst.

Under the process of the present invention, a catalyst is prepared by combination of a porous carrier with one or more catalytically active metals to form a catalyst precursor having a volatile content. The volatile content of the catalyst precursor is then reduced in one or more steps. Volatile content reduction may take place, for example, by treating the precursor in air at temperatures below calcination temperatures, or simply by dehydrating at ambient conditions. At least one of the volatile content reduction steps is conducted in the presence of one or more sulfur containing compounds and, prior to this volatile content reduction-sulfurizing step, the catalyst precursor is not allowed to reach calcination temperatures.

The combined volatile content reduction-sulfurizing step(s) may be conducted in-situ or ex-situ. After volatile content reduction and sulfurizing is completed, the catalyst may be activated further using a liquid phase activation at elevated temperatures. For example, is ex-situ pre-sulfurizing is employed, the catalyst may be contacted with a lighter feedstock to produce a supported metal sulfide catalyst. A variety of other sulfurizing techniques may be used to produce a sulfurized catalyst and reduce solvents from the catalyst pores at the same time. No conventional high temperature calcining of the catalyst or catalyst precursor is necessary.

The catalyst undergoes a weight loss during processing as volatile compounds such as solvents and/or organic and inorganic ligands (functional coordinating groups having one or more pairs of electrons to form coordination bonds with metals) are removed. As used herein, "volatile content" shall mean weight loss as calculated following exposure of a sample to air at 482° C. for two hours:

[(sample weight before treatment)–(sample weight after treatment)×100.sample weight before treatment]×100.

As used herein, "catalyst precursor" means a carrier which has been combined with one or more catalytically active metals which have not yet been activated.

"Sulfurizing",, when used herein, means contacting the catalyst precursor with one or more sulfur containing compounds. A "sulfurized catalyst" is a catalyst in which active metal components are converted, at least in part, to metal sulfides.

In the process of this invention, the catalyst precursor, that is a carrier with deposited active metals, and optionally promoters, is not calcined. At least one volatile content reduction step is conducted in the presence of one or more sulfur containing compounds. The volatile content of the catalyst precursor is typically no less than about 0.5%, preferably from 2% to 25%, most preferably from 6 to 10% before the catalyst precursor is exposed to the combined volatile content reduction-sulfurizing step. No calcination of the catalyst precursor is necessary or performed and, in fact, allowing the catalyst precursor to reach calcination temperatures is detrimental to the results seen when the process of the invention is used. The combined volatile content reduction-sulfurizing step may be done in-situ (in the reactor where the catalyst will be used) or ex-situ. The hydrotreating performance of the resultant catalyst is greatly improved over catalyst made by the conventional method, and the process is simplified by eliminating the high temperature calcination step of conventional processes.

A porous support is typically used to carry the catalytically reactive metal(s). For hydrotreating catalysts, supports are typically alumina, alumina-silica, silica, titania, zirconia, bona, magnesia, zeolites and combinations thereof. Porous carbon-based materials such as activated carbon and/or porous graphite can be utilized as well. The preferred supports in this invention are alumina-based and alumina-silica-based carriers. Catalytically active metals typically chosen from Groups VI and VIII of the Periodic Table are deposited onto the support. Typically the metals are selected from molybdenum, tungsten, cobalt, nickel, and mixtures thereof. Promoters, such as phosphorous, may be used in combination with the catalytically active metals. Variations in catalyst preparation methods include impregnation, co-mulling and co-precipitation. The preferred method in this invention is impregnation, with the most preferred method being incipient wetness impregnation. The use of aqueous solutions is common; however, organic solvents such as aliphatic and aromatic hydrocarbons, alcohols, ketones, etc., can also be used to deposit soluble active components and promoters onto the carrier. Examples of aqueous solutions include those containing molybdates (such as di- and hepta-molybdates), molybdo- and tungsto-phosphates and silicates, polyoxometallates (such as heteropolyacids and transition metal complexes thereof), various metal chelate complexes, amine complexes, etc. The pH value of the aqueous solutions typically range from 1 to 12. The solution preparation techniques and methods for impregnation are well known in the art.

The catalyst precursor of the present invention may have some of its volatile content reduced in air at temperatures below calcination temperatures, including ambient conditions, or it may be moved directly to the sulfurizing step. Partial volatile content reduction to remove physically adsorbed solvents (remaining from an impregnation step) aids in transporting the catalyst should the volatile content reduction be conducted in-situ.

Without being tied to a particular theory, it is believed that the process of the invention controls the formation of bulky metal oxide phases in the catalyst pores by direct interaction of the catalytic metal with a sulfur containing compound below calcination temperatures, such that thermal agglomeration of the active component does not occur. As the precursor is sulfurized, sulfur compounds displace the solvent and the sulfur reacts with the metals to form highly dispersed metal sulfides before a substantial amount of bulky metal oxides can form. In the process of the invention the catalyst precursor, containing residual moisture, is exposed to a sulfur containing compound at temperatures that convert the metal precursors to catalytically active metal sulfides and drive the moisture out of the catalyst pores.

Typical in-situ sulfurization may utilize either gaseous hydrogen sulfide in the presence of hydrogen or liquid-phase sulfurizing agents such as organo sulfur compounds including alkylsulfides and polysulfides, thiols, sulfoxides, etc.

In ex-situ sulfurization, the catalyst is typically supplied to the user (refiner) in the "pre-sulfided" form where the metal oxides are converted at least in part to metal sulfides. Commercial ex-situ sulfurization processes include, for example, the ACTICAT® process (CRI International. Inc.), described in U.S. Pat. Nos. 5,468,372 and 5,688,736, and the SULFICAT® process (Eurecat US Inc.). In the practice of the present invention, ex-situ sulfurizing is preferred.

In the present invention the known ex-situ and in-situ processes described are modified by not calcining the catalyst at high temperatures prior to contacting the catalyst with sulfur compounds. At least one of the volatile content reduction steps is conducted in the presence of one or more sulfur containing compounds. Significantly higher activity and stability of the uncalcined catalyst are achieved as compared with catalyst made by conventional processes of separate drying, calcining and sulfurizing steps. It is believed that higher hydrotreating activity is achieved because of higher dispersion of active components since thermal agglomeration does not occur during catalyst preparation.

The catalyst made by the process of the invention may be used in a process for removing heteroatom and other contaminants from a hydrocarbonaceous feedstock accompanied by boiling point reduction. Such a process comprises contacting of catalyst with a feedstock at elevated temperature and elevated pressure in the presence of hydrogen with one or more catalyst beds. Temperatures are typically in the range from about 200° C. to about 470° C., total pressures are typically in the range of from about 50 psig to about 3500 psig, and liquid hourly space velocities (LHSV) typically range from 0.05 to 25 $h^{-1}$.

Process for Making the Co-containing Catalyst Precursor

The Co-containing catalyst precursor of the present invention is prepared by combining a porous carrier with a cobalt compound and, optionally, with one or more additional catalytically active metal compounds, to form a Co-containing catalyst precursor having a volatile content. A sample of the Co-containing catalyst precursor is then subjected to examination by Diffuse Reflectance Ultraviolet-visible (UV-vis) Spectroscopy. If the sample so analyzed exhibits a reflectance pattern such that it has reflectance maxima between 460 nm and 500 nm and between 660 nm and 690 nm, the Co-containing catalyst precursor is selected for further processing in accordance with the process of the present invention.

Diffuse Reflectance Ultraviolet-visible (UV-vis) Spectra

Ultraviolet-visible (UV-Vis) spectroscopy is the measurement of the absorption of electromagnetic radiation by materials in the wavelength range of approximately 200 to 900 nanometers (nm). Absorption of electromagnetic radiation in this range is associated with transitions by electrons between electronic levels in atoms or molecular orbitals in compounds. In the case of condensed matter, these absorptions tend to be quite broad with solids exhibiting absorptions up to several hundred nanometers in bandwidth. When the absorption is in the visible portion of the electromagnetic spectrum, the material is colored.

The interaction of light with matter is often very complicated, particularly when it involves condensed matter. In the case of UV-Vis spectroscopy of solids, the spectrum obtained is a function not only of the absorbed light, but also of the scattered light of different wavelengths which can interact strongly with the material due to particle size (diffraction), and to the absorption edge. In general, solids are too thick to transmit light to measurable degree. Grinding the solid and dispersing it in a non-absorbing medium, as is done in infrared spectroscopy, does not work in UV-Vis spectroscopy since it is difficult to grind particles that are smaller than the wavelengths of light involved. Indeed, grinding the material and dispersing it increases the complexity of the spectrum since diffraction effects are now superimposed on the spectrum. These experimental difficulties are generally overcome either by dissolving the material and obtaining a spectrum in solution, or, when that is not possible, by obtaining a spectrum in a diffuse reflectance apparatus.

Under diffuse reflectance conditions, light that is scattered in multiple directions is measured while light that is specularly reflected is blocked. Specular reflection is mirror-like reflection in which the angle of the incident light to the normal of the surface is equal to the angle of reflection. Inclusion of specularly reflected light results in inverted or derivative shaped bands ("reststrahlen" bands) in the spectrum making the spectra more difficult to interpret. The best way to avoid specularly reflected light in UV-Vis spectroscopy is by the use of an integrating sphere. This commercially available technology places the sample at one location on a sphere and the detector at 90 degrees from the sample, thus avoiding the specularly reflected light. The inside of the sphere is coated with a special diffusely reflective material that has a flat spectral response, i.e.. reflects all wavelengths approximately equally. The detector then measures the intensity of the (diffusely) reflected light as a function of wavelength to construct the diffuse reflectance spectrum.

EXAMPLES

Catalyst Activity Testing

Hydrotreating activities of the catalysts of the following Examples were compared on a volumetric basis using trickle flow micro-reactors. The same catalyst volume, basis compacted bulk density, was used for each set of test conditions. The reactors were operated in an isothermal regime. To ensure appropriate irrigation and plug flow characteristics, the trilobe-shaped extrudated catalyst pellets were diluted with 80-60 mesh SiC in the volumetric catalyst-to-dilutant ratio of either 1:1 (Test Conditions 1–3) or 1:2.5 (Test Condition 4–5), and loaded into the reactor in several aliquots.

In-Situ Catalyst Sulfurization

A gas mixture of 5% $H_2S$ in hydrogen was used for catalyst sulfurizing. The sulfurizing pressure was maintained at about 50 psig (Test Conditions 1–3) and 150 psig (Test Condition 4). Temperature ramping during sulfurization was as follows: ambient to 204° C. at a rate of 1.5° C./min, holding for 2 hours, heating to 316° C. at a rate of 2° C./min, holding for 1 hour; heating to 371° C. at a rate of 3° C./min, holding for 2 hours; cooling to 204° C. and introducing a test feed.

Ex-Situ Catalyst Sulfurization

The ex-situ pre-sulfurizing was performed using the ACTICAT® process. A sample of catalyst was treated with a stoichiometric amount, based on the metal content of the catalyst, of powdered elemental sulfur plus 1.0 wt. % excess, based on the weight of the total catalyst, followed by heating the sulfur-incorporated catalyst in the presence of a liquid olefinic hydrocarbon. The pre-sulfurized catalyst precursors were activated in-situ using standard liquid phase activation.

Liquid Phase Catalyst Activation

The ex-situ pre-sulfurized catalyst precursors were placed into a trickle flow micro-reactor and activated with a diesel feed to convert the sulfur compounds on the pores into metal sulfides. Catalyst activation took place at a unit pressure of 600–900 psig, a hydrogen flow rate of 220 ml/min, and a diesel feed LHSV of 1 to 1.5 $h^{-1}$. The temperature was ramped to 135° C. and held for 1 hour; increased at a rate of 24° C./hour to 371° C. and held for 1 hour; and decreased to 204° and held for two hours followed by test feed introduction.

Test Condition 1:

| Catalyst: | 100 cc stacked bed: |  |
| --- | --- | --- |
|  | Commercial HDM catalyst - 33.3% |  |
|  | Experimental Catalyst - 66.7% |  |
| Pressure: | 1900 psig |  |
| LHSV: | 0.33 $hr^{-1}$ (total system) |  |
| WABT: | 385° C. |  |
| Gas Rate: | 4,000 scf $H_2$/bbl |  |
| Test Feed: | Straight run long (atmospheric) residue: |  |
|  | Sulfur | 4.34 wt. % |
|  | Nitrogen | 0.26 wt. % |
|  | Nickel | 18.5 ppm |
|  | Vanadium | 62.0 ppm |
|  | Basic Nitrogen | 667 ppm |
|  | Microcarbon residue | 11.4 wt. % |
|  | Density at 15° C. | 0.97 g/ml |

Test Condition 2:

| Catalyst: | 50 cc single bed: |  |
| --- | --- | --- |
| Pressure: | 1000 psig |  |
| LHSV: | 1.5 $hr^{-1}$ |  |
| WABT: | 354° C. |  |
| Gas Rate: | 2,000 scf $H_2$/bbl |  |
| Test Feed: | Heavy vacuum gas oil: |  |
|  | Sulfur | 1.07 wt. % |
|  | Nitrogen | 0.29 wt. % |
|  | Nickel | 0.8 ppm |
|  | Vanadium | 0.6 ppm |
|  | Basic Nitrogen | 930 ppm |
|  | Microcarbon residue | 0.3 wt. % |
|  | Density at 15° C. | 0.92 g/ml |

Test Condition 3:

| Catalyst: | 25 cc single bed: |  |
| --- | --- | --- |
| Pressure: | 2100 psig |  |
| LHSV: | 0.3 $hr^{-1}$ |  |
| WABT: | 385° C. |  |
| Gas Rate: | 2,000 scf $H_2$/bbl |  |
| Test Feed: | Demetallized vacuum residue: |  |
|  | Sulfur | 2.15 wt. % |
|  | Nitrogen | 0.39 wt. % |
|  | Nickel | 19.0 ppm |
|  | Vanadium | 33.0 ppm |
|  | Basic Nitrogen | 1354 ppm |
|  | Microcarbon residue | 12.0 wt. % |
|  | Density at 15° C. | 0.98 g/ml |

Test Condition 4:

| Catalyst: | 20 cc single bed: |  |
| --- | --- | --- |
| Pressure: | 1650 psig |  |
| LHSV: | 2.2 $hr^{-1}$ |  |
| WABT: | 343° C. and 363° C. |  |
| Gas Rate: | 3,500 scf $H_2$/bbl |  |
| Test Feed: | Cat. Cracked gas oil: |  |
|  | Sulfur | 4.91 wt. % |
|  | Nitrogen | 0.181 wt. % |
|  | Density at 15° C. | 0.94 g/ml |

Test Condition 5:

| Catalyst: | 50 cc single bed |  |
| --- | --- | --- |
| Pressure: | 600 psig |  |
| LHSV: | 1.0 $hr^{-1}$ |  |
| WABT: | 343° C. and 363° C. |  |
| Gas Rate: | 1,000 scf $H_2$/bbl |  |
| Test Feed: | Straight run gas oil |  |
|  | Sulfur | 1.8 wt. % |
|  | Nitrogen | 0.0448 wt. % |
|  | Density at 15° C. | 0.86 g/ml |

Example 1

An alumina extrudate (1.2 mm trilobe) was dried in air at 482° C. for two hours. The extrudate had the following physical properties:

| | |
|---|---|
| Compacted bulk density | 0.475 g/cc |
| Water pore volume | 0.94 cc/g |
| B. E. T. surface area | 296 m$^2$/g |

An impregnation solution was made by dissolving 39.1 g of phosphomolybdic acid (75%, obtained from ACROS) and 9.72 g NiCO$_3$ in 100 g de-ionized water at 60° C. After complete dissolution, 7.02 g of 85% H$_3$PO$_4$ were added. The volume of the solution was adjusted to a value equal to the water pore volume of the support. 200 grams of the support were impregnated with the solution and aged for 2 hours. The amount of metals loaded (dry basis) was 8 wt. % Mo, 2 wt. % Ni and 1 wt. % P.

To remove excess moisture, the catalyst precursor was air-treated below 85° C. for 1 hour and the volatile content was reduced to 6%, whereafter the precursor was recovered still containing residual moisture. The precursor was further dehydrated simultaneously with sulfurizing during an ACTICAT® process. No calcination steps were employed. The resultant catalyst is denoted as Catalyst A.

Catalyst A was placed into a micro-reactor and activated with a diesel feed, followed by testing according to Test Condition 1. The HDS activity of Catalyst A, as weighted average bed temperature (WABT) required for 88% HDS, is shown in FIG. 1.

Example 2—Comparative

An alumina extrudate (1.2 mm trilobe) with the following properties was used to make Catalyst B:

| | |
|---|---|
| Compacted bulk density | 0.484 g/cc |
| Water pore volume | 0.95 cc/g |
| B. E. T. surface area | 308 m$^2$/g |

Catalyst B was prepared by pore volume impregnation of the support as described in Example 1 followed by air-drying at 121° C. for 4 hours and calcination in air flow at 482° C. for 2 hours. The catalyst was then sulfided in-situ via a conventional method using a 5% H$_2$S in hydrogen mixture as described below.

Catalyst B was tested under Test Condition 1. The HDS activity of Catalyst B, as WABT required for 88% HDS, is shown in FIG. 1.

Example 3

A commercial 1.3 trilobe extrudate carrier #1 was used to make Catalyst C.

The impregnation solution was prepared by stirring together 21.62 g NiO, 35.2 g MoO$_3$, 9.05 g 86.1% phosphoric acid and de-ionized water. The volume of the mixture was approximately 168 ml. The mixture was heated, with stirring, to 99° C. for about 3 hours until the impregnation solution components were dissolved. The mixture was then cooled to ambient temperature. The volume of solution was adjusted to the pore volume of 200 grams of the support, which was impregnated as described in Example 1. The metal contents loaded were 3.8 wt. % Ni, 13.6 wt. % Mo and 2.0 wt. % P (dry basis).

The catalyst precursor was dehydrated in air at 99° C. for four hours until the volatile content was 6%. The catalyst precursor was then treated with the ACTICAT® process without employing any calcination steps. The resultant catalyst is referred to as Catalyst C.

Catalyst C was tested in Test Condition 1 versus a commercial catalyst treated with the standard ACTICAT® process using separate calcination and pre-sulfurizing steps (Catalyst D). The HDS activities of Catalysts C and D, as WABT required for 88% HDS, are shown in FIG. 2.

Example 4

The properties of the alumina extrudate (1.2 mm trilobe) used to make Catalysts E and F was as follows:

| | |
|---|---|
| Compacted bulk density | 0.505 g/cc |
| Water pore volume | 0.87 cc/g |
| B. E. T. surface area | 277 m$^2$/g |

The impregnation solution was prepared by dissolving 5.25 g NiCO$_3$ and 16.67 g ammoniun dimolybdate, (NH$_4$)$_2$Mo$_2$O$_7$. (56.45 wt. % Mo) in 60 ml of 14.8 NH$_3$ solution in water. The volume of the solution was adjusted to 87 cc, and 100 g of the support was impregnated as described in Example 1. The metal loading was 2.3 wt. % Ni and 8.0 wt. % Mo (dry basis). The catalyst precursor was dehydrated overnight in air at 127° C. to remove excessive moisture and ammonia, then cooled to ambient temperature and divided into two equal portions. The first portion was directly presulfurized using the ACTICAT® process without any calcination step to remove residual moisture and load sulfur into the catalyst, as described in Example 3. The resultant catalyst is denoted as Catalyst E. The second portion was conventionally calcined at 482° C. for 2 hours, and sulfurized in-situ using an H$_2$/H$_2$S gas mixture (Catalyst F).

Catalyst E was tested versus Catalyst F using Test Condition 1. The HDS relative vloumetric activity (derived from the second order reaction rate constants for the two catalysts) was 25% higher for Catalyst E compared to that for Catalyst F at 400 hours on stream.

Example 5

Catalyst C was tested using Test Condition 2 versus a commercial catalyst (Catalyst G) which used the same carrier as that for Catalyst C. The (pre-calcined) commercial catalyst wa sulfurized in-situ using an H$_2$/H$_2$S gas mixture. The comparison test results are presented on FIGS. 3 and 4.

Example 6

Catalyst C was tested versus a commercial reference catalyst (same as Catalyst D except the sulfurization of the pre-calcined catalyst was performed in-situ using an H$_2$/H$_2$S gas mixture). The commercial catalyst is denoted as Catalyst H.

HDS activities of the two catalysts were compared using Test Condition 3. The HDS relative volumetric activity (derived from the second order reaction rate constants for the two catalysts) was 25% higher for Catalyst C compared to that for Catalyst H at 400 hours on stream.

Example 7

A commercial 1.3 trilobe extrudate carrier was used to make Catalyst I. The impregnation solution was prepared using the procedure described in Example 6; however the metal contents (dry basis) were as follows: 13.0 wt. % Mo, 3.0 wt. % Ni, 3.2 wt. % P. The catalyst precursor was dehydrated in air at 99° C. for three hours until the volatile content was 8%. The catalyst precursor was then treated with the ACTICAT® process without any additional drying/calcination steps.

Catalyst I was tested using Test Condition 4 versus a commercial catalyst (Catalyst J) having the same carrier and percentage of metals as Catalyst I. The (pre-calcined) commercial catalyst was sulfurized in-situ using an $H_2/H_2S$ gas mixture. The HDN relative volumetric activity (derived from the first order reaction rate constants for the two catalysts) was 20% higher for Catalyst I compared to that for Catalyst J at 200 hours on stream at 343° C. WABT, and 40% higher for the Catalyst I at 300 hours at 363° C.

Example 8—Comparative

A commercial catalyst treated with standard ACTICAT® process using separate calcination and pre-sulfurizing steps (Catalyst D) was compared with the same type of commercial catalyst sulfurized in-situ with $H_2/H_2S$ gas mixture (Catalyst K), using Test Condition 1. Catalyst D and Catalyst K were statistically undistinguishable in HDS and HDN performance during the test run (1400 hours on stream), demonstrating that effects seen due to the process of the invention are not due to differences in presulfurizing process.

As shown in the Examples and seen in FIGS. 1–4, the HDS and HDN activities of the catalysts prepared by the process of the invention (Catalysts A, C, E and I) are significantly higher than that of the catalysts prepared by standard processes utilizing separate steps for drying, calcining and sulfurizing. Consequently, substantially lower sulfur and/or nitrogen content in the petroleum product is achievable by combining the drying/sulfurizing steps and eliminating the calcining step. A higher activity catalyst makes it possible to operate a commercial unit at less severe conditions while producing on-spec product. This in turn should increase the catalyst life and decrease operating costs.

Example 9

This example describes the preparation of a sample of the Co-containing catalyst precursor of the present invention (catalyst precursor L). Catalyst precursor L was brown in color.

A commercial 1.3 trilobe extrudate carrier #1 (containing about 1% Ni) was used to make Catalyst precursor L.

The impregnation solution was prepared by stirring together 37.86 g $CoC_3$ (49.8% Co, Hall), 160.27 g $MoO_3$ (66.5% Mo, Climax), 58.3 g phosphoric acid (85% $H_3PO_4$, Aldrich) and 440 ml of de-ionized water. The volume of the mixture was approximately 550 ml. The mixture was heated, with stirring, to 99° C. for about 3 hours until the impregnation solution components were dissolved, and total volume of the solution was reduced to c.a. 420 ml. The mixture was then cooled to ambient temperature. The volume of solution was adjusted to the pore volume of 550 grams of the calcined support (440 ml), which was impregnated with the solution and aged for 2 hours. The metal contents loaded were 3.8 wt. % Co, 13.6 wt. % Mo, 0.8 wt. % Ni and 2.0 wt. % P (dry basis).

The catalyst precursor was air-treated at 99° C. for four hours until the volatile content was 9%. At this point the UV-Vis DR (Diffuse Reflectance) Spectrum of the sample was taken as presented on FIGS. 5 and 6. The two reflectance maxima were revealed at 488 nm and 676 nm. A portion of the catalyst precursor was then treated with the ACTICAT® process without employing any calcination steps to produce Catalyst L'.

Example 10—Comparative

This example describes the preparation of a sample of a Co-containing catalyst precursor not of the present invention (catalyst precursor M). Catalyst precursor M was blue-gray.

The catalyst precursor was prepared as in Example 9 through drying at 99° C. for four hours until the volatile content was 9%. Then, a portion of the catalyst precursor was calcined at 482° C. for 2 hours. The UV-Vis DR (Diffuse Reflectance) Spectrum of the calcined sample was taken as presented on FIGS. 5 and 6. The two reflectance maxima were revealed at 467 nm and 726 nm. The calcined catalyst precursor was then treated with the ACTICAT® process to give the Catalyst M'.

Recording of UV-Vis Diffuse Reflectance Spectra

For these experiments, 0.5 g of each sample was ground with an agate mortar and pestle for five minutes until they were a uniform flour-like consistency. These powders were then placed in a 13 mm diameter pellet press and pressed under 15,000 pounds of pressure in a hydraulic press. The self-supporting pellets were then mounted on the integrating sphere of the diffuse reflectance apparatus using adhesive tape to hold them in place and the UV-Vis spectrum was obtained. Diffuse reflectance UV-Vis spectra were obtained on a Cary 4C Ultraviolet-Visible spectrometer at one nanometer intervals at a scan rate of 300 nm/min. The background used for all spectra was a supplied reflectance standard. The spectra obtained all exhibit strong backgrounds which were removed by subtracting straight line segments. This procedure served to make the bands more obvious. Care was taken to try to avoid the introduction of anomalous bands.

The results of these experiments are shown in FIG. 5 for the uncorrected data and in FIG. 6 for the baseline-corrected data. In order to accurately reveal the positions of maxima in the UV-Vis Diffuse Reflectance spectra, the second derivative of the uncorrected data function was taken. The second derivative of the data is obtained using the algorithms in RazorTools® version 6 available from Spectrum Square Associates, 755 Snyder Hill, Ithaca, N.Y. 14850, USA. These algorithms are based on Bayesian analysis as detailed in the RazorTools manual and in papers available upon request from Spectrum Square Associates. The only inputs required to generate the derivative of the data are the original data and a gaussian-shaped band of approximately (within 20%) the same width as the narrowest observed band in the original data. Generation of this gaussian-shaped band is easily accomplished with the built-in functions in RazortTools® version 6. This method is significantly better than the traditional Savitsky-Golay method for generating spectral derivatives since it does not incorporate an arbitrary smoothing function.

Example 11

Catalyst L' was tested versus Catalyst M' using Test Condition 5. The HDS relative volumetric activities (derived from the 1.5 order reaction rate constants for the two catalysts) were 20% higher and 50%higher (at 343° C. and 363° C., respectively) higher for Catalyst L' compared to that for Catalyst M'.

It will be apparent to one of ordinary skill in the art that many changes and modifications may be made to the invention without departing from its spirit or scope as set forth herein.

We claim:

1. A process for making a Co-containing catalyst precursor comprising:

providing a porous support;

combining said support with a cobalt-containing compound, thereby forming a catalyst precursor having a volatile content;

analyzing the catalyst precursor by Ultraviolet-visible (UV-vis) Electromagnetic Radiation; and, selecting the catalyst precursor having reflectance maxima between 460 nm and 500 nm and between 660 nm and 690 nm.

2. The process of claim 1 further comprising one or more additional compounds comprising metal selected from the group consisting of Group VIB and Group VIII of the Periodic Table.

3. A process for preparing a Co-containing hydrotreating catalyst comprising preparing a catalyst precursor having a volatile content by the process of claim 1; and reducing the volatile content of the catalyst precursor in one or more steps, wherein at least one volatile content reduction step is performed in the presence of at least one sulfur containing compound resulting in at least one combined volatile content reduction-sulfurizing step; wherein said catalyst precursor does not reach calcining temperatures prior to said at least one combined volatile content reduction-sulfurizing step.

4. The process according to claim 3 wherein said at least one volatile content reduction-sulfurizing step is completed ex-situ.

5. The process according to claim 3 wherein said at least one volatile content reduction-sulfurizing step is completed in-situ.

6. The process according to claim 3 wherein said catalyst precursor has a volatile content greater than 0.5 percent preceding said at least one volatile content reduction step in the presence of at least one sulfur containing compound.

7. A Co-containing hydrotreating catalyst made by the process of claim 3.

8. The catalyst of claim 7 wherein said at least one volatile content reduction-sulfurizing step is completed ex-situ.

9. The catalyst of claim 7 wherein said at least one volatile content reduction-sulfurizing step is completed in-situ.

10. The catalyst of claim 7 wherein said catalyst precursor has a volatile content greater than 0.5 percent preceding said at least one volatile content reduction step performed in the presence of one or more sulfur containing compounds.

* * * * *